US011409986B2

(12) United States Patent
Gandra et al.

(10) Patent No.: US 11,409,986 B2
(45) Date of Patent: Aug. 9, 2022

(54) TRAINABLE VISION SCALER

(71) Applicant: INTEL CORPORATION, Santa Clara, CA (US)

(72) Inventors: Chaitanya R. Gandra, El Dorado Hills, CA (US); Chyuan-Tyng Wu, San Jose, CA (US); Gilad Michael, Sunnyvale, CA (US); Liron Ain-Kedem, Kiryat Tivon (IL); Leo Isikdogan, Santa Clara, CA (US)

(73) Assignee: INTEL CORPORATION, San Jose, CA (US)

( * ) Notice: Subject to any disclaimer, the term of this patent is extended or adjusted under 35 U.S.C. 154(b) by 42 days.

(21) Appl. No.: 16/232,336

(22) Filed: Dec. 26, 2018

(65) Prior Publication Data

US 2019/0130217 A1 May 2, 2019

Related U.S. Application Data (60) Provisional application No. 62/767,776, filed on Nov. 15, 2018.

(51) Int. Cl.
| | |
|---|---|
| *G06K 9/00* | (2022.01) |
| *G06K 9/62* | (2022.01) |
| *G06V 10/20* | (2022.01) |
| *G06V 10/44* | (2022.01) |
| *G06V 20/00* | (2022.01) |
| *G06T 5/20* | (2006.01) |

(52) U.S. Cl.
CPC ......... *G06K 9/6256* (2013.01); *G06K 9/6274* (2013.01); *G06T 5/20* (2013.01); *G06V 10/20* (2022.01); *G06V 10/454* (2022.01); *G06V 20/00* (2022.01); *G06T 2207/20048* (2013.01); *G06T 2207/20081* (2013.01); *G06T 2207/20084* (2013.01); *G06T 2207/20224* (2013.01)

(58) Field of Classification Search
CPC .... G06K 9/00624; G06K 9/4628; G06K 9/54; G06K 9/6256; G06K 9/6274; G06T 2207/20048; G06T 2207/20081; G06T 2207/20084; G06T 2207/20224; G06T 5/20
See application file for complete search history.

(56) References Cited

U.S. PATENT DOCUMENTS

| | | | |
|---|---|---|---|
| 2017/0169315 A1* | 6/2017 | Vaca Castano | G06K 9/6814 |
| 2017/0345130 A1* | 11/2017 | Wang | G06T 3/4053 |

(Continued)

OTHER PUBLICATIONS

Mody, Mihir, Manu Mathew, and Shyam Jagannathan. "Efficient Pre-Processor for CNN." Electronic Imaging 2017.19 (2017): 50-53. (Year: 2017).*

(Continued)

*Primary Examiner* — Hadi Akhavannik
(74) *Attorney, Agent, or Firm* — Hanley, Flight & Zimmerman, LLC (57) ABSTRACT

An example apparatus for processing images includes a trainable vision scaler to receive an image. The trainable vision scaler is to generate output including a feature map or an enhanced image based on the image. The trainable vision scaler is to transmit the output to a computer vision network. The computer vision network is trained to perform a computer vision task using the output.

20 Claims, 8 Drawing Sheets

(56) References Cited

U.S. PATENT DOCUMENTS

2018/0075581 A1* 3/2018 Shi .................. G06N 3/084
2018/0293706 A1* 10/2018 Viswanathan ........ G06T 3/4092

OTHER PUBLICATIONS

Mody, Mihir; Mathew, Manu; Jagannathan, Shyam: "Efficient Pre-Processor for CNN" Conference: 2017 IEEE International Conference on Consumer Electronics-Asia (ICCE-Asia) pp. 50-53.

Wu, Bichen; Wan, Alvin; Iandola, Forrest; Jin, Peter H.; Keutzer, Kurt: "SqueezeDet: Unified, Small, Low Power Fully Convolutional Neural Networks for Real-Time Object Detection for Autonomous Driving" Computer Science > Computer Vision and Pattern Recognition, Submitted Dec. 2016 last revised Nov. 2017, arXiv:1612.01051, 9 pages.

Geiger, Andreas; Lenz, Philip; Urtasun, Raquel: "Are we ready for Autonomous Driving? The KITTI Vision Benchmark Suite" 2012 IEEE Conference on Computer Vision and Pattern Recognition; Date of Conference Jun. 16-21, 2012 Providence RI USA, 8 pages.

Tensorflow: "tensorflow::ops::FakeQuantWithMinMaxArgs" Retrieved from the Internet on Feb. 19, 2019; https://www.tensorflow.org/api_docs/cc/class/tensorflow/ops/fake-quant-with-min-max-args, 3 pages.

Hegarty et al., "Darkroom: Compiling High-Level Image Processing Code into Hardware Pipelines" ACM Transactions on Graphics (TOG) TOG Homepage ,vol. 33 Issue 4, Jul. 2014, Article No. 144, ACM New York, NY, USA 11 pages.

Heide et al., :"FlexISP: A Flexible Camera Image Processing Framework"; Published in: Proc. ACM SIGGRAPH Asia, vol. 33 Issue 6, Nov. 2014 , Article No. 231, New York NY USA, 13 pages.

Chen et al., "Fast Image Processing with Fully Conventional Networks", 2017 IEEE International Conference on Computer Vision (ICCV), Oct. 2017, Stanford University USA, 10 pages.

Gharbi et al., "Deep Bilateral Learning for Real-Time Image Enhancement", ACM Transactions on Graphics, vol. 36 Issue 4, Jul. 2017, Article No. 118 , New York, NY USA ,12 pages.

Ronneberger et al.,"U-net: Convolutional networks for biomedical image segmentation. In International Conference on Medical image computing and computer-assisted intervention", International Conference on Medical Image Computing and Computer-Assisted Intervention Nov. 2015 pp. 234-241. Freibrurg, Germany, 8 pages.

Whatmough et al.,"Fixynn: Efficient Hardware for Mobile Computer Vision via Transfer Learning" Conference: SysML Mar. 2019 Conference on Systems and Machine Learning (SysML), 13 pages.

* cited by examiner

TRAINABLE VISION SCALER

CROSS-REFERENCE TO RELATED APPLICATION

This application is a non-provisional filing of provisional U.S. Patent Application No. 62/767,776, filed Nov. 15, 2018, entitled "TRAINABLE VISION SCALER AND VISION LOCAL TONE MAPPER," the contents of which are hereby incorporated by reference for all purposes.

BACKGROUND

Computer Vision (CV) networks can be trained to detect objects or perform other computer vision tasks. For example, a CV network can include a convolutional neural network (CNN) trained on annotated training images to detect various objects.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

As discussed above, Computer Vision (CV) networks can be trained to detect objects or perform other computer vision tasks. For example, a camera can capture frames of video and send the frames to the CV network for detecting one or more objects. However, transmitting high-resolution output from an imaging sensor or image signal processor (ISP) to a CV network may use a lot of bandwidth. Moreover, reducing the resolution or frame rate of video may result in unacceptable computer vision performance. For example, applications such as autonomous driving may use high frame rates as well as high resolution frames.

The present disclosure relates generally to techniques for training a trainable vision scaler and performing computer vision tasks using the trainable vision scaler. Specifically, the techniques described herein include apparatuses, methods and systems for training trainable vision scalers and performing computer vision tasks using trainable vision scalers. An example apparatus includes a trainable vision scaler to receive an image. The trainable vision scaler is to generate an output based on the image. In various examples, the output is a feature map or an enhanced image. The trainable vision scaler is to transmit the output to a computer vision network. The computer vision network is trained to perform a computer vision task using the output.

The techniques described herein thus enable high frame rates to be maintained while preserving details in the images. The techniques describe herein are thus not only content-aware but also trainable. This processing sequence preserves the information that is useful for a convolutional neural network to efficiently learn discriminative features even after significant data reduction. The techniques described herein, help reduce the data transmission bandwidth between the ISP and a CV engine resulting in savings in power consumption, and also make the ISP more CV application oriented leading to an overall better-optimized pipeline. In particular, the techniques described herein significantly reduce the amount of transmitted data between the ISP and computer vision engine without a significant negative impact on performance of the computer vision engine.

Figure 1:
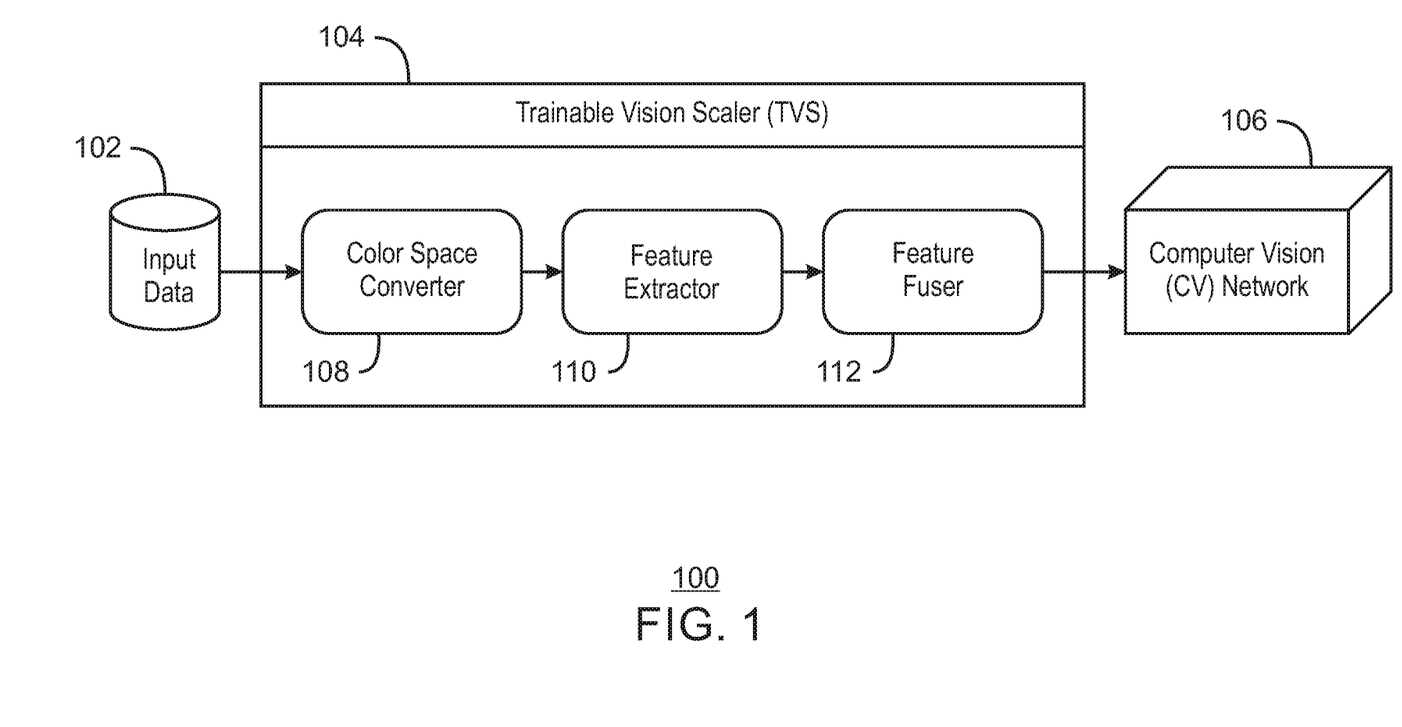
FIG. 1 is a block diagram illustrating an example system for performing computer vision tasks using a trainable vision scaler.

FIG. 1 is a block diagram illustrating an example system for performing computer vision tasks using a trainable vision scaler. The example system 100 can be trained in the computing device 700 in FIG. 7 using the methods 500 or 600 of FIGS. 5 and 6 to perform the method 400 of FIG. 4.

The example system 100 includes input data 102. For example, the input data 102 may be frames of video from an imaging device or an image signal processor. The system 100 includes a trainable vision scaler (TVS) 104 shown receiving the input data 102. The system 100 further includes a computer vision (CV) network 106 communicatively coupled to the TVS 104. The TVS 104 further includes a color space converter (CSC) 108. The TVS 104 also includes a feature extractor communicatively coupled to the color space converter 108. The TVS includes a feature fuser 112 communicatively coupled to the feature extractor 110.

As shown in FIG. 1, the trainable vision scaler 104 may have been trained to receive input data 102 and output feature maps or enhanced images to the CV network 106. The CV network may be trained to perform a computer vision task on the received feature maps or enhanced images. For example, the CV network 106 may be trained to detect one or more object in the feature maps or enhanced images received from the TVS 104. In particular, the feature maps or enhanced images may be smaller in size compared to the input data 102. In various examples, the TVS 104 scales the input data 102 by down-sampling and generating features maps or enhanced images of smaller size. Thus, the feature maps or enhanced images can transmitted to the CV network more efficiently.

In various examples, the trainable visual scaler (TVS) 104 is a neural network framework with three major components as depicted in FIG. 1. In some examples, the TVS 104 includes a color space converter 108 to perform color space conversion. For example, some CV systems may assume that the input images or videos are in RGB format. On the other hand, an ISP pipeline may use a different color space, such as YUV or YCbCr. Instead of directly converting the data into a particular color space, a color space conversion module can be defined as a simple 1×1 convolution layer with biases to learn a suitable color space. In some examples, the TVS 104 also includes a feature extractor 110 to perform feature extraction. In various examples, the feature extractor 110 extracts and boosts low-level features, such as edges and textures, while reducing the input resolution. In some examples, the edges and textures are used in a particular computer vision task. When TVS is trained using an image quality loss to enforce images that look appealing to humans in some use cases, the feature extractor 110 can learn image enhancement filters while preserving or improving the computer vision performance. In some examples, the feature extractor 110 can downscale the input via flexible stride control, supporting scaling factors that require non-integer strides, such as ×2.5, among other non-integer strides. A stride is an amount by which a filter shifts on an input before generating a consecutive output. Flexible stride control is thus used to decrease the size of output by increasing the size of the stride. The filter convolves around the input volume. As one example, the feature extractor 110 is a neural network layer defined as a K×K×3×N convolutional layer followed by a non-linear activation function, where N is the number of output filters and K is the filter size. The feature extractor 110 can also be defined as a combination of K×K×1×N1, K1×K1×1×N1, and K2×K2×1×N1 filters. In some examples, different filter sizes are used to extract features at different scales such that N1=N/3. As one example, a single-scale convolutional layer of size 7×7×3×30 is used for feature extraction.

The TVS 104 also further includes a feature fuser 112 to perform feature fusion. Since computer vision systems typically expect images as inputs, the number of output channels (C2) is matched to the number of input channels (C1). In various examples, the feature fuser 112 projects the feature maps produced by the previous feature extraction layer into C2 output channels. As one example, the feature fuser 112 is a neural network layer that is defined as either a 1×1×N×3 non-linear convolution layer or as three 1×1×(N/3)×1 non-linear convolution layers, one per output channel. In some examples, the TVS 104 can downscale an input image up to a scaling factor×(K−1) in a single pass. In some examples, larger factors can be achieved with multiple passes through the TVS 104. The CV network 106 can receive downscaled images or feature maps from the TVS 104 and perform CV tasks using the downscaled images or feature maps.

The diagram of FIG. 1 is not intended to indicate that the example system 100 is to include all of the components shown in FIG. 1. Rather, the example system 100 can be implemented using fewer or additional components not illustrated in FIG. 1 (e.g., additional input data, trainable visual scalers, CV networks, neural network layers, etc.).

Figure 2:
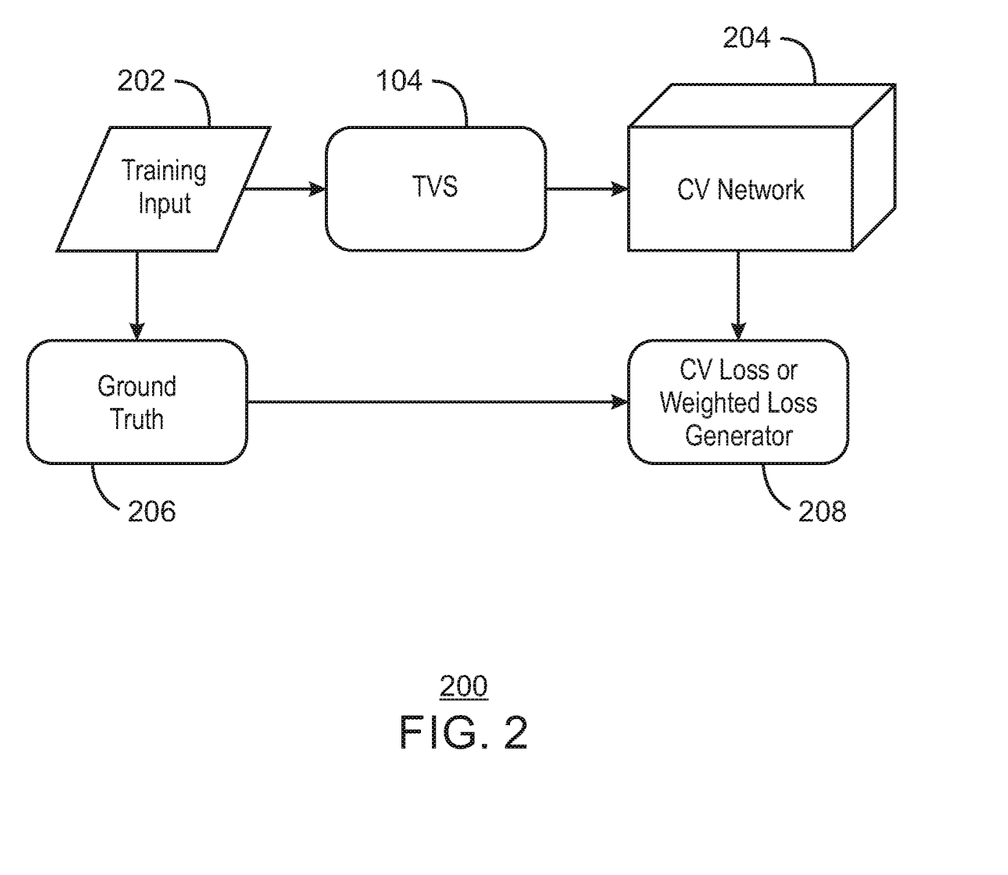
FIG. 2 is a flow chart illustrating an example system for training a trainable vision scaler to output feature maps to be used by a computer vision network.

FIG. 2 is a diagram illustrating an example system for training a trainable vision scaler to output feature maps to be used by a computer vision network. The example system 200 can be implemented in the computing device 700. For example, the system 200 can be implemented using the training network 740 of the computing device 700 of FIG. 7, or the training module 814 of the computer readable media 800 of FIG. 8.

The example system 200 includes training input 202 shown being received at a trainable vision scaler (TVS) 104. The training input 202 can also include ground truth 206 that can be generated based on the images. For example, the ground truth 206 can be labels indicating correct detections for any number of objects in each of the images of the training input 202. In the example of FIG. 2, input 202 received by the TVS 104 has the same size. The system 200 also further includes a computer vision (CV) network 204 communicatively coupled to the TVS 104. For example, the CV network 204 can be the CV network 106 of FIG. 1. In some examples, the CV network 204 can be a CV network that is similar to the CV network 106. For example, the CV network 204 may perform a similar function as the CV network 106 of FIG. 1. The system 200 includes a ground truth 206 shown being generated based on the training input 202. In some examples, the ground truth 206 is provided along with the training images in the dataset received as training input 202, which might be manually labeled in advance. The system 200 also includes a CV Loss or weighed loss generator 208 communicatively coupled to the CV network 204 and receiving the ground truth 206.

As shown in FIG. 2, a TVS 104 may be jointly trained with a CV network 204 based on training input 202. For example, the training input 202 can include images of different sizes. In the object detection example of FIG. 2, the CV network 204 is initialized as a backbone network pre-trained weights in the training phase for the TVS 104. The pre-trained weights are the training result when the training images are directly passed to the CV network 106 without TVS 104. For example, the training images can be used from ImageNet.

In some examples, the system 200 can be trained to reduce bit precisions of feature map activations and parameters to save computation time and memory. Regarding the weights, even if the network is trained with 32-bit floating point weights, the performance of the target application using the CV network 204 may not degrade greatly when the weights in the scaler are converted to 8-bit fixed-point once the training is complete. For example, in an 8-bit fixed-point representation, a weight k can be approximated by $Fk \times 2^{-S}$, where Fk is an 8-bit integer (usually including 1 bit for the sign) and S is a shift scale. The shift scale S is shared among the elements in one parameter. For example, if the convolution kernel K of the color space converter (CSC) is a 1×1×3×3 matrix, S is determined by the maximum absolute value of these 9 elements in the equation:

$$K = \{ki, i = 1, \ldots, 9\}, S = -\left\lceil \log_2\left(\frac{\max_{k_i \in K}\|k_i\|}{2^7 - 1}\right)\right\rceil \quad \text{Eq. 1}$$

where $\lceil \cdot \rceil$ is the ceiling function. Then, the integer part of each element can be calculated using the equation:

$$F_{k_i} = \left[\frac{k_i}{2^{-S}}\right] \text{ for } k_i \in K, \quad \text{Eq. 2}$$

where $[\cdot]$ is the round function.

Due to the individual parameter shift scales, the bit precision of the feature maps may increase fast in the fixed-point calculation. For example, the convolution computation with biases can be expressed as K×I+B, where K, B, and I are the kernels, biases, and input respectively. In some examples, K and B can be approximated as $F_K \cdot 2^{-S_K}$ and $F_B \cdot 2^{-S_B}$ in fixed-point, and $F_K$ and $F_B$ are 8-bit integers. If the input I is a simple 8-bit activation, then K×I is a 16-bit element with shift scale $S_K$. If $S_B$ is larger than $S_K$, i.e. $\Delta S = S_B - S_K > 0$, it may take (16+ΔS)-bit to represent K×I+B. Therefore, for the next stage, the input bit-precision is (16+ΔS)-bit, and the total bits used to represent the data may increase quickly if ΔS is large. Thus, to address this increase in size, in some examples, a further approximation is used. When ΔS is large, the biases may be relatively small and have a fewer contribution to the calculation outcome. Therefore, B can be alternatively approximated as $\tilde{F}_B 2^{-S_K}$ to avoid the extra demands of ΔS-bit. When $S_B$ is smaller than $S_K$, as long as the difference is smaller than the bit precision of I, no additional bit is used to express the outcome of K×I+B.

In some examples, the feature activations therefore include additional processing in the training process to be able to have a fixed point precision during the inference when the bit precision is reduced. If the output activation of a module is presumed to be fixed-point, the maximum absolute value of the output can be updated at each training step using the moving average technique. Assume $S_A$ is the shift scale for the activation A, and it is derived by the maximum absolute value of A. In order to simulate the computation in hardware, the activation A is adjusted as $$\tilde{A} = 2^{-S_A} \cdot \left[\frac{A}{2^{-S_A}}\right]$$

before passing it to the next module. With this additional adjustment, the network is trained in floating point. However, the round function may not be differentiable, which may complicate the computation of the gradient during the backpropagation process in the training. Therefore, differentiable functions can be used to mimic this behavior, such as the fake quantization functions in the TensorFlow™ library, version 1.12.0 released Nov. 5, 2018. In some examples, for the final output feature map, the adjustment is $$\tilde{A} = \left[\frac{A}{2^{-S_A}}\right]$$

instead since integers are used in a hardware implementation of the vision scaler. In some examples, the interfaces between the modules 108, 110, 112 are also integers, but the shift scale can be handled inside a receiving module (not shown). Thus, using the techniques described herein, the quantization thus does not corrupt the performance of the target computer vision application.

The TVS 104 with CV output has higher detection average precisions compared with the result of using bilinear interpolation with the same scale factor. If the backbone network is randomly initialized and trained from scratch, even larger benefits of the trainable visual scaler can be achieved. In one example, the generalization of trained visual scaler was tested by applying the proposed scaler parameters trained with one topology (the SqueezeDet+ topology, as released December 2016, with a SqueezeNet deep neural network, version 1.1 released April 2016, backbone and ×2 scale factor) and reused (i.e., no training/fine tuning) with different scale factors (×2.5) with the same backbone (SqueezeNet) and a different backbone (for example, the 50 layer Residual Network Resnet50, released December 2015). The results indicated higher detection average precisions compared with the result of using bilinear interpolation with the same scale factor.

The diagram of FIG. 2 is not intended to indicate that the example system 200 is to include all of the components shown in FIG. 2. Rather, the example system 200 can be implemented using fewer or additional components not illustrated in FIG. 2 (e.g., additional inputs, networks, etc.). For example, a bilinear resizer may be included if the input 202 is from a source that provides images that are not the same size, as described in FIG. 3. For example, the bilinear resizer can resize the training input 202 into a predetermined common size.

Figure 3:
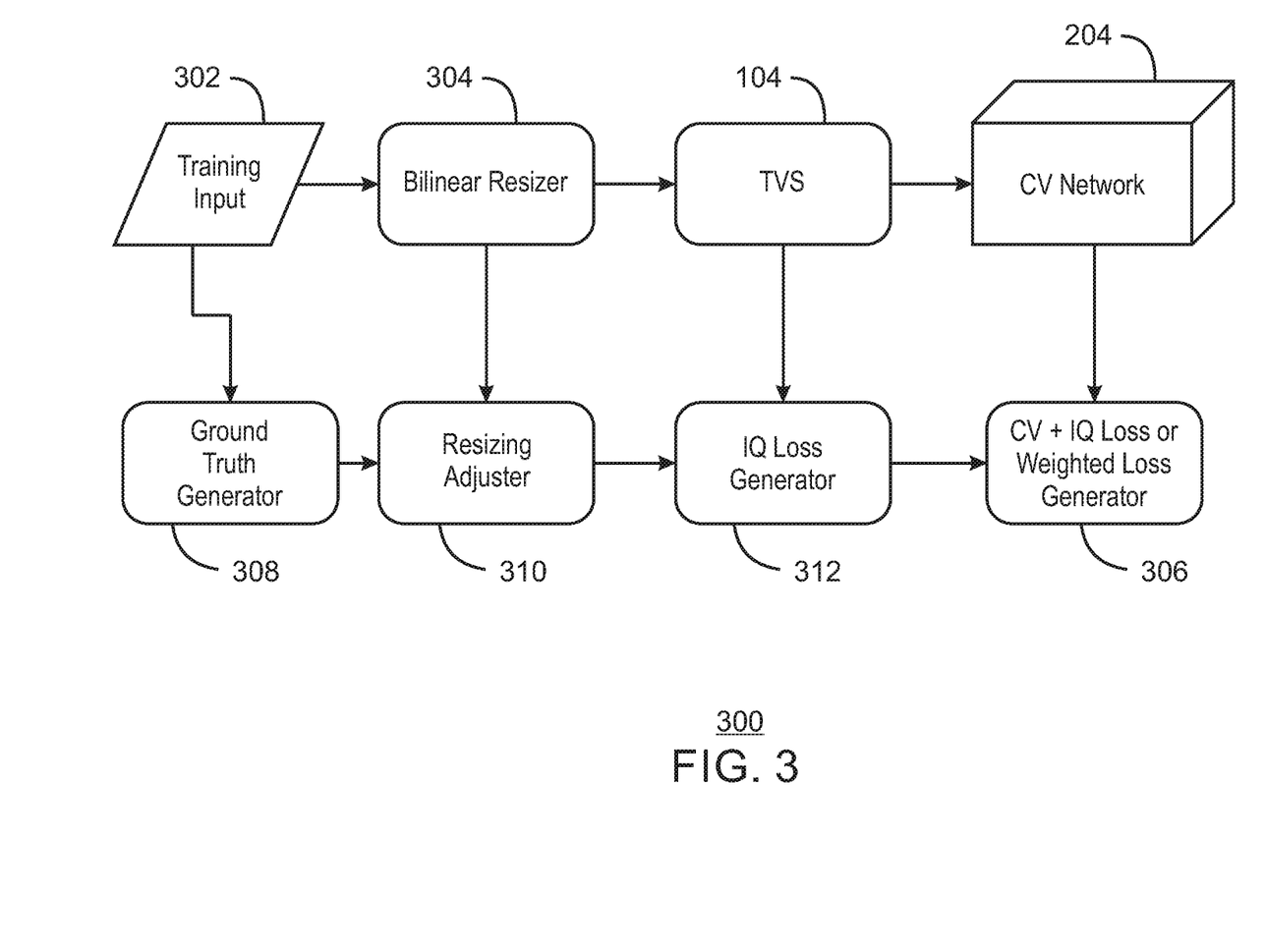
FIG. 3 is a diagram illustrating an example system for training a trainable vision scaler to output enhanced images to be used by a computer vision network.

FIG. 3 is a diagram illustrating an example system for training a trainable vision scaler to output enhanced images to be used by a computer vision network. The example system 300 can be implemented in the computing device 700. For example, the system 300 can be implemented using the training network 740 of the computing device 700 of FIG. 7 or the training module 814 of the computer readable media 800 of FIG. 8.

The system 300 of FIG. 3 includes training input 302 received at a bilinear resizer 304. The system 300 includes a TVS 104 that is communicatively coupled to the bilinear resizer 304. The bilinear resizer 304 is communicatively coupled to a TVS 104. The TVS 104 is also communicatively coupled to a CV network 204. The system 300 includes a CV+IQ loss or weighted loss generator 306 communicatively coupled to the CV network 204. The system 300 includes a ground truth generator 308 communicatively coupled to receive training input 302. The system 300 further includes a resizing adjuster 310 communicatively coupled to the ground truth generator 308, the bilinear resizer 304, and an IQ loss generator 312. The IQ loss generator 312 is communicatively coupled to the CV+IQ loss or weighted loss generator 306.

In the example of FIG. 3, the TVS 104 is trained to generate enhanced images with improved image quality. In various examples, the TVS 104 is trained end-to-end towards minimizing the loss function of a backbone neural network that follows the TVS 104 to improve the performance of a target computer vision application by providing the computer vision application enhanced images with improved quality. In some examples, the TVS 104 can also be trained to learn approximating an ensemble of enhancement filters, such as the Lanczos filter, guided filters, weighted least squares filters, and edge-aware local Laplacian filters. The TVS 104 can be trained to approximate these filters while also solving for the target computer vision task by jointly optimizing the loss function to approximate the enhancement filters via an image quality (IQ) loss and the loss function that optimizes the computer vision performance, referred to herein as computer vision (CV) loss. In various examples, the IQ loss generated by the IQ loss generator 312 is a simple L1 or L2 difference or a more complex loss function defined between TVS output and the enhancement filter outputs.

In some examples, to improve the image quality for low light, small pixels, or cheap optics modules, the input images of the target computer vision network can be treated as target images. For example, sensor images are generated by simulating sensor or optics characteristics; loss optimization can be performed in a similar way. For example, loss can be calculated between an ideal high quality image and a cheap sensor's output. In various examples, the vision scaler does not scale, but is trained to translate poor image quality to high image quality. Additionally, in some examples, perceptual loss training with various lower and intermediate layer outputs can be used. Perceptual loss training may include calculating the L1/L2 difference between an intermediate layer of a CNN when fed with ideal data and with degraded data. Perceptual loss training allows the vision scaler to train towards the goal of having the CV engine's CNN perform as if the data was of higher quality.

Thus, with IQ loss from IQ loss generator 312 added to training, the output of the TVS 104 improves from the perspective of human vision. Moreover, as verified in experiments, the resulting output results in higher detection average precisions compared with the result of directly using input images.

The diagram of FIG. 3 is not intended to indicate that the example system 300 is to include all of the components shown in FIG. 3. Rather, the example system 300 can be implemented using fewer or additional components not illustrated in FIG. 3 (e.g., additional training inputs, bilinear resizers, networks, etc.). For example, the bilinear resizer 304 may not be included if the input 202 is from a source that provides images that are the same size.

Figure 4:
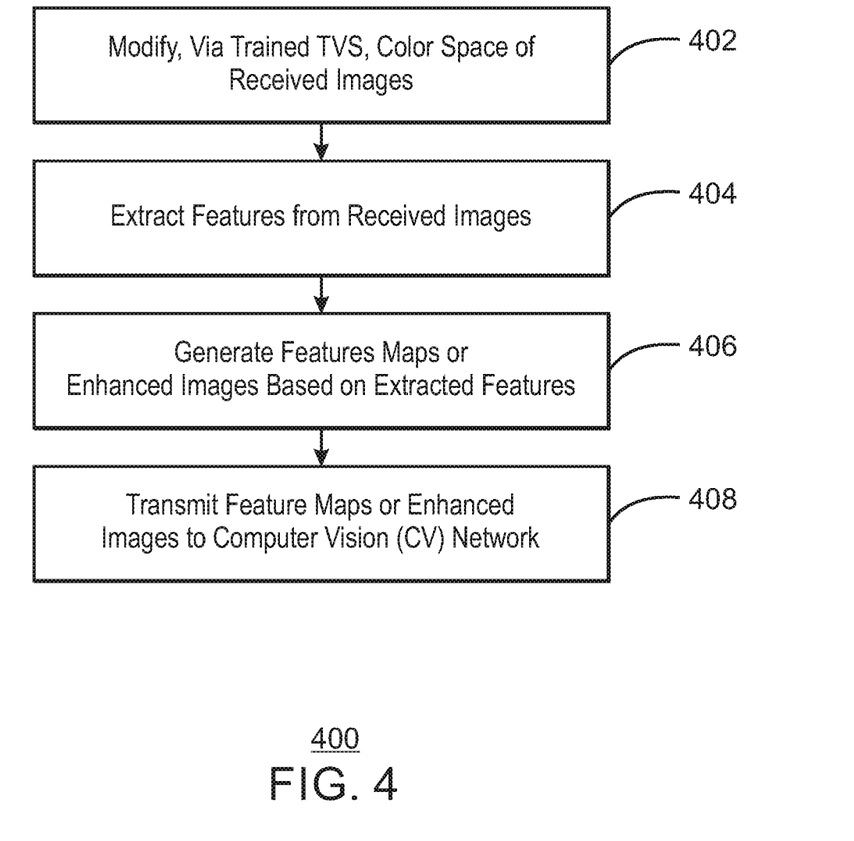
FIG. 4 is a flow chart illustrating a method for generating feature maps or enhanced images using a trainable vision network.

FIG. 4 is a flow chart illustrating a method for generating feature maps or enhanced images using a trainable vision network. The example method 400 can be implemented in the TVS 104 of the system 100 of FIG. 1, using the processor 702 of the computing device 700 of FIG. 7, or the computer readable media 800 of FIG. 8.

At block 402, a color space of received images is modified. In various examples, the color space can be converted into a color space learned during training. For example, the TVS can be trained to learn an optimal color space throughout training. In some examples, the TVS can learn to convert the color space of the image into a color space used by the CV network. In some examples, the TVS can learn to convert the color space into a color space that is not the same as the original image color space used in CV network without TVS. For example, the color space may be different than the color space of the CV network especially when TVS and CV network are jointly trained.

At block 404, features are extracted from the received images. In various example, edges or textures are detected in the received image. In some examples, a simple or complex image enhancement filter is applied to the received image.

At block 406, feature maps or enhanced images are generated based on the extracted features. In some examples, the images are downscaled based on the extracted features using flexible stride control to generate feature maps or enhanced images. In various examples, the enhanced images are not downscaled.

At block 408, the feature maps or enhanced images are transmitted to a computer vision (CV) network. For example, the CV network may be configured to perform a CV task based on the feature map or enhanced image. In some examples, a mean pixel value, a maximum pixel value, and a minimum pixel value of output per channel is transmitted to the CV network. For example, the CV network can perform whitening on the feature map or the enhanced image based on the mean pixel value, the maximum pixel value, and the minimum pixel value of output per channel.

This process flow diagram is not intended to indicate that the blocks of the method 400 are to be executed in any particular order, or that all of the blocks are to be included in every case. Further, any number of additional blocks not shown may be included within the method 400, depending on the details of the specific implementation. For example, the method 400 may include performing multiple passes of processing on the received image in response to detecting a target downscale factor that exceeds a threshold factor.

Figure 5:
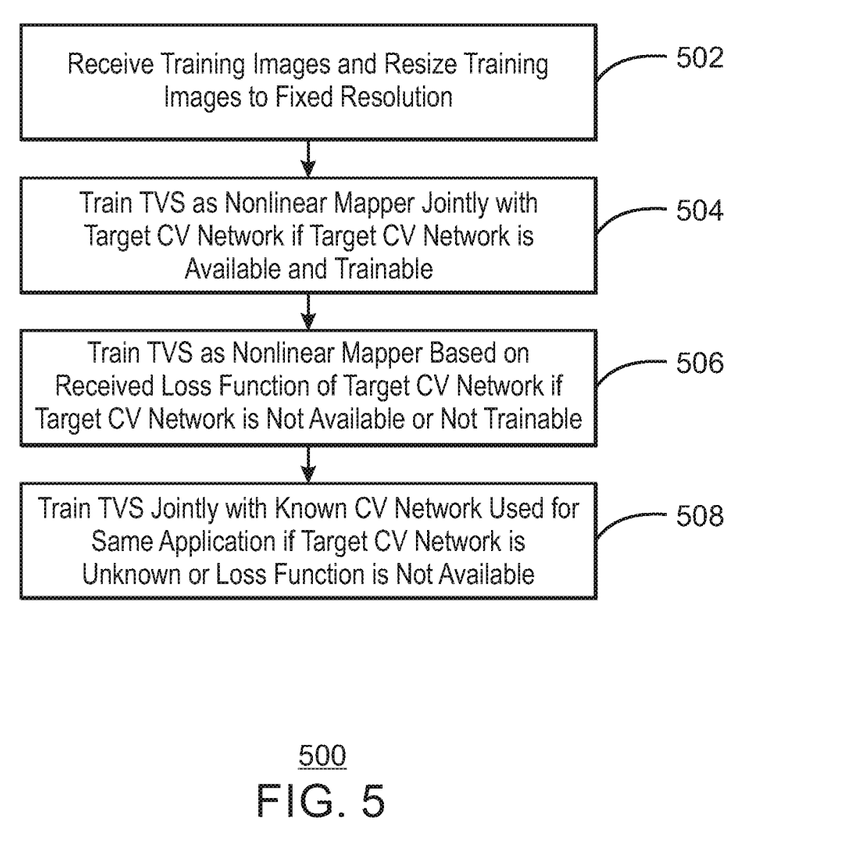
FIG. 5 is a flow chart illustrating various methods for training a trainable vision scaler to output feature maps.

FIG. 5 is a flow chart illustrating various methods for training a trainable vision scaler to output feature maps. The example methods 500 can be implemented to train the TVS 104 of the system 100 of FIG. 1, using the processor 702 and training network 740 of the computing device 700 of FIG. 7, or the computer readable media 800 of FIG. 8.

At block 502, training images are received and resized to a fixed resolution. For example, the fixed resolution may be a predetermined resolution.

At block 504, a trainable vision scaler (TVS) is jointly trained as a nonlinear mapper with a target CV network if the target CV network is available and trainable. For example, the trainable visual scaler can be jointly trained end-to-end with the computer vision network.

At block 506, the TVS is trained as a nonlinear mapper based on a received loss function of a target CV network if the target CV network is not available or not trainable. For example, the target CV network may be known but unavailable, and thus loss function may be received and used for training instead.

At block 508, the TVS is jointly trained with a known CV network used for a same application if the target CV network is unknown or the loss function for the target CV network is not available. For example, the trainable visual scaler can be trained with a second computer vision network that is trained to perform a vision task that is similar to the vision task performed by the computer vision network.

This process flow diagram is not intended to indicate that the blocks of the example methods 500 are to be executed in any particular order, or that all of the blocks are to be included in every case. Indeed, either block 504, 506, or 508 is executed for a particular training session. Further, any number of additional blocks not shown may be included within the example methods 500, depending on the details of the specific implementation. For example, training the trainable visual scaler may include using restricted feature activations and parameters.

Figure 6:
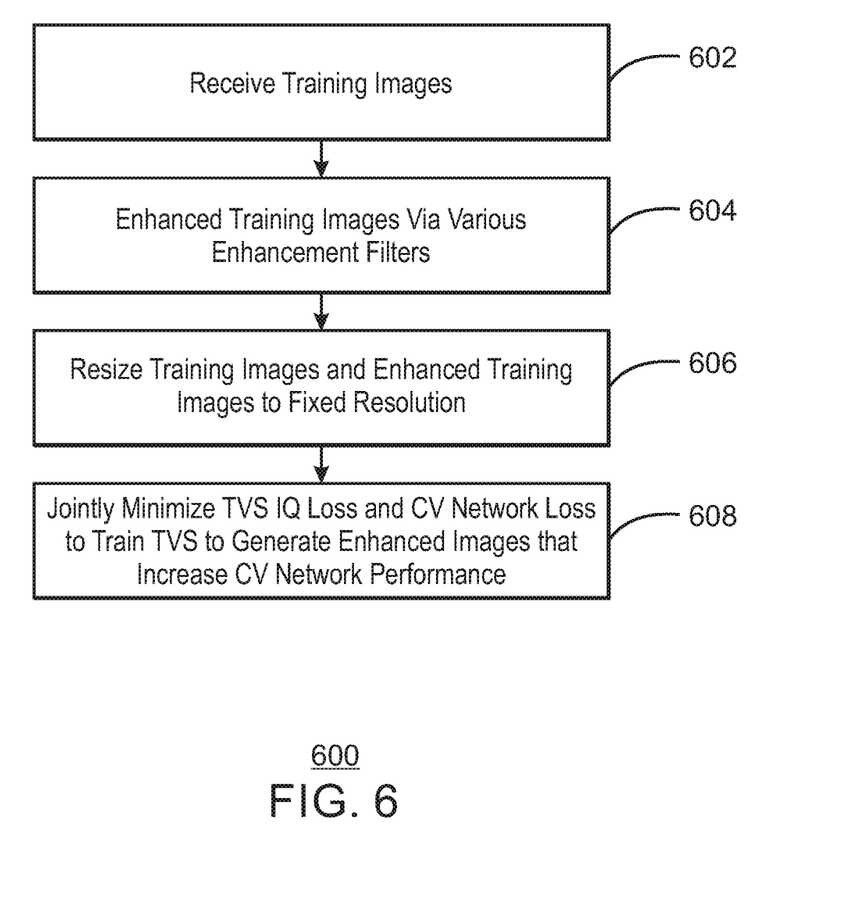
FIG. 6 is a flow chart illustrating a method for training a trainable vision scaler to output enhanced images.

FIG. 6 is a flow chart illustrating a method for training a trainable vision scaler to output enhanced images. The example method 600 can be implemented to train the TVS 104 of the system 100 of FIG. 1, using the processor 702 and training network 740 of the computing device 700 of FIG. 7, or the computer readable media 800 of FIG. 8.

At block 602, training images are received. For example, the training images include a set of images with labeled ground truths for objects in the images.

At block 604, the training images are enhanced via various enhancement filters. In various examples, the enhancement filters include the Lanczos filter, guided filters, weighted least squares filters, or edge-aware local Laplacian filters.

At block 606, the training images and enhanced training images are resized to a fixed resolution. For example, a bilinear resizer can resize the training images and enhanced training images.

At block 608, a TVS IQ loss and CV loss is jointly minimized to train the TVS to generate enhanced images that increase CV network performance. In various examples, the IQ loss is a simple L1 or L2 difference. In some examples, the IQ loss is a more complex loss function defined between TVS output and the enhancement filter outputs.

This process flow diagram is not intended to indicate that the blocks of the method 600 are to be executed in any particular order, or that all of the blocks are to be included in every case. Further, any number of additional blocks not shown may be included within the method 600, depending on the details of the specific implementation. For example, training the trainable visual scaler may include using restricted feature activations and parameters.

Figure 7:
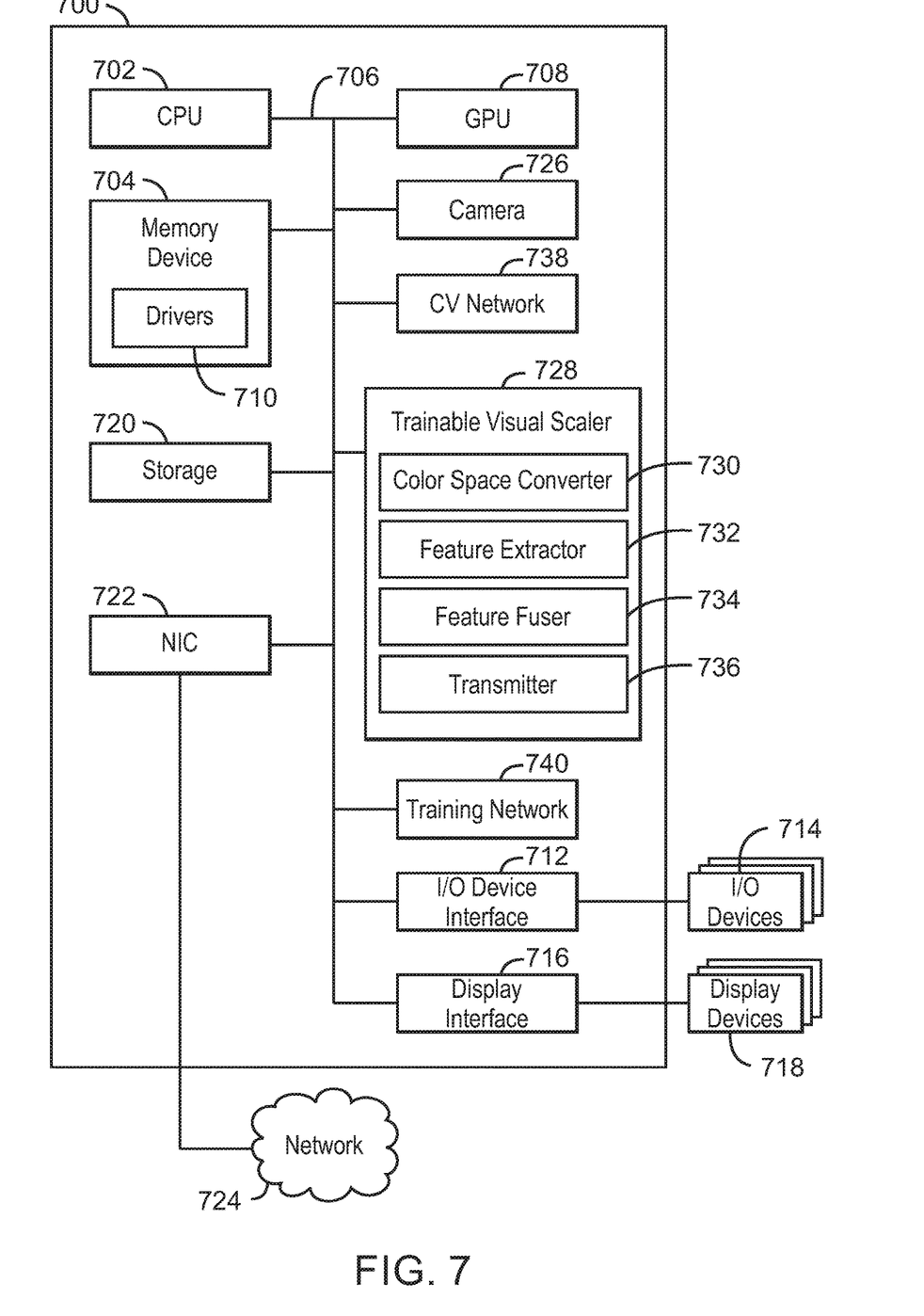
FIG. 7 is block diagram illustrating an example computing device that can train and perform computer vision tasks with a trainable vision scaler.

Referring now to FIG. 7, a block diagram is shown illustrating an example computing device that can train and perform computer vision tasks with a trainable vision scaler. The computing device 700 may be, for example, a laptop computer, desktop computer, tablet computer, mobile device, or wearable device, among others. In some examples, the computing device 700 may be a security camera device. The computing device 700 may include a central processing unit (CPU) 702 that is configured to execute stored instructions, as well as a memory device 704 that stores instructions that are executable by the CPU 702. The CPU 702 may be coupled to the memory device 704 by a bus 706. Additionally, the CPU 702 can be a single core processor, a multi-core processor, a computing cluster, or any number of other configurations. Furthermore, the computing device 700 may include more than one CPU 702. In some examples, the CPU 702 may be a system-on-chip (SoC) with a multi-core processor architecture. In some examples, the CPU 702 can be a specialized digital signal processor (DSP) used for image processing. The memory device 704 can include random access memory (RAM), read only memory (ROM), flash memory, or any other suitable memory systems. For example, the memory device 704 may include dynamic random access memory (DRAM).

The memory device 704 can include random access memory (RAM), read only memory (ROM), flash memory, or any other suitable memory systems. For example, the memory device 704 may include dynamic random access memory (DRAM).

The computing device 700 may also include a graphics processing unit (GPU) 708. As shown, the CPU 702 may be coupled through the bus 706 to the GPU 708. The GPU 708 may be configured to perform any number of graphics operations within the computing device 700. For example, the GPU 708 may be configured to render or manipulate graphics images, graphics frames, videos, or the like, to be displayed to a user of the computing device 700.

The memory device 704 can include random access memory (RAM), read only memory (ROM), flash memory, or any other suitable memory systems. For example, the memory device 704 may include dynamic random access memory (DRAM). The memory device 704 may include device drivers 710 that are configured to execute the instructions for generating enhanced images or feature maps. The device drivers 710 may be software, an application program, application code, or the like.

The CPU 702 may also be connected through the bus 706 to an input/output (I/O) device interface 712 configured to connect the computing device 700 to one or more I/O devices 714. The I/O devices 714 may include, for example, a keyboard and a pointing device, wherein the pointing device may include a touchpad or a touchscreen, among others. The I/O devices 714 may be built-in components of the computing device 700, or may be devices that are externally connected to the computing device 700. In some examples, the memory 704 may be communicatively coupled to I/O devices 714 through direct memory access (DMA).

The CPU 702 may also be linked through the bus 706 to a display interface 716 configured to connect the computing device 700 to a display device 718. The display device 718 may include a display screen that is a built-in component of the computing device 700. The display device 718 may also include a computer monitor, television, or projector, among others, that is internal to or externally connected to the computing device 700.

The computing device 700 also includes a storage device 720. The storage device 720 is a physical memory such as a hard drive, an optical drive, a thumbdrive, an array of drives, a solid-state drive, or any combinations thereof. The storage device 720 may also include remote storage drives.

The computing device 700 may also include a network interface controller (NIC) 722. The NIC 722 may be configured to connect the computing device 700 through the bus 706 to a network 724. The network 724 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 700 further includes a camera 726. For example, the camera may include one or more imaging sensors.

The computing device 700 further includes a trainable vision scaler 728. For example, the trainable vision scaler 728 may be a convolutional neural network. The trainable vision scaler 728 can receive an image and generate an output including a feature map or an enhanced image based on the image. The trainable vision scaler 728 can include a color space converter 730, a feature extractor 732, a feature fuser 734, and a transmitter 736. In some examples, each of the components 730-736 of the trainable vision scaler 728 may be a microcontroller, embedded processor, or software module. The color space converter 730 can be trained to convert a color space of the image into a color space learned during training. The feature extractor 732 can be trained to receive images and extract features from the received images. In some examples, the feature extractor 732 is trained to enhance the image to generate an enhanced image. In some examples, the feature extractor 732 is trained to downscale images using flexible stride control. The feature fuser 734 is trained to generate the output with a number of channels that match a number of channels to be received by the computer vision network. In some examples, the output is down-sampled. The transmitter 736 can transmit the output to a computer vision (CV) network. As one example, the CV network is the CV network 738.

The computing device 700 also further includes a computer vision (CV) network 738. For example, CV network 738 can perform CV tasks. In some examples, the CV network 738 can perform tasks using the output, such as a feature map or an enhanced image. For example, the tasks can include object detection, object recognition, object classification, etc. In some examples, the CV network 738 may perform vision tasks similar to the vision tasks by a target CV network.

The computer device also includes a training network 740. The training network 740 can be used to train the trainable vision scaler 728 and the CV network 738. For example, the training network 740 can jointly train the TVS 728 end-to-end with the CV network 738. In some examples, the training network 740 can train the TVS 728 using a loss function associated with the CV network 738.

The block diagram of FIG. 7 is not intended to indicate that the computing device 700 is to include all of the components shown in FIG. 7. Rather, the computing device 700 can include fewer or additional components not illustrated in FIG. 7, such as additional buffers, additional processors, and the like. The computing device 700 may include any number of additional components not shown in FIG. 7, depending on the details of the specific implementation. Furthermore, any of the functionalities of the color space converter 730, the feature extractor 732, the feature fuser 734, the transmitter 736, the CV network 738, or the training network 740, may be partially, or entirely, implemented in hardware and/or in the processor 702. For example, the functionality may be implemented with an application specific integrated circuit, in logic implemented in the processor 702, or in any other device. In addition, any of the functionalities of the CPU 702 may be partially, or entirely, implemented in hardware and/or in a processor. For example, the functionality of the trainable visual scaler 728 may be implemented with an application specific integrated circuit, in logic implemented in a processor, in logic implemented in a specialized graphics processing unit such as the GPU 708, or in any other device.

Figure 8:
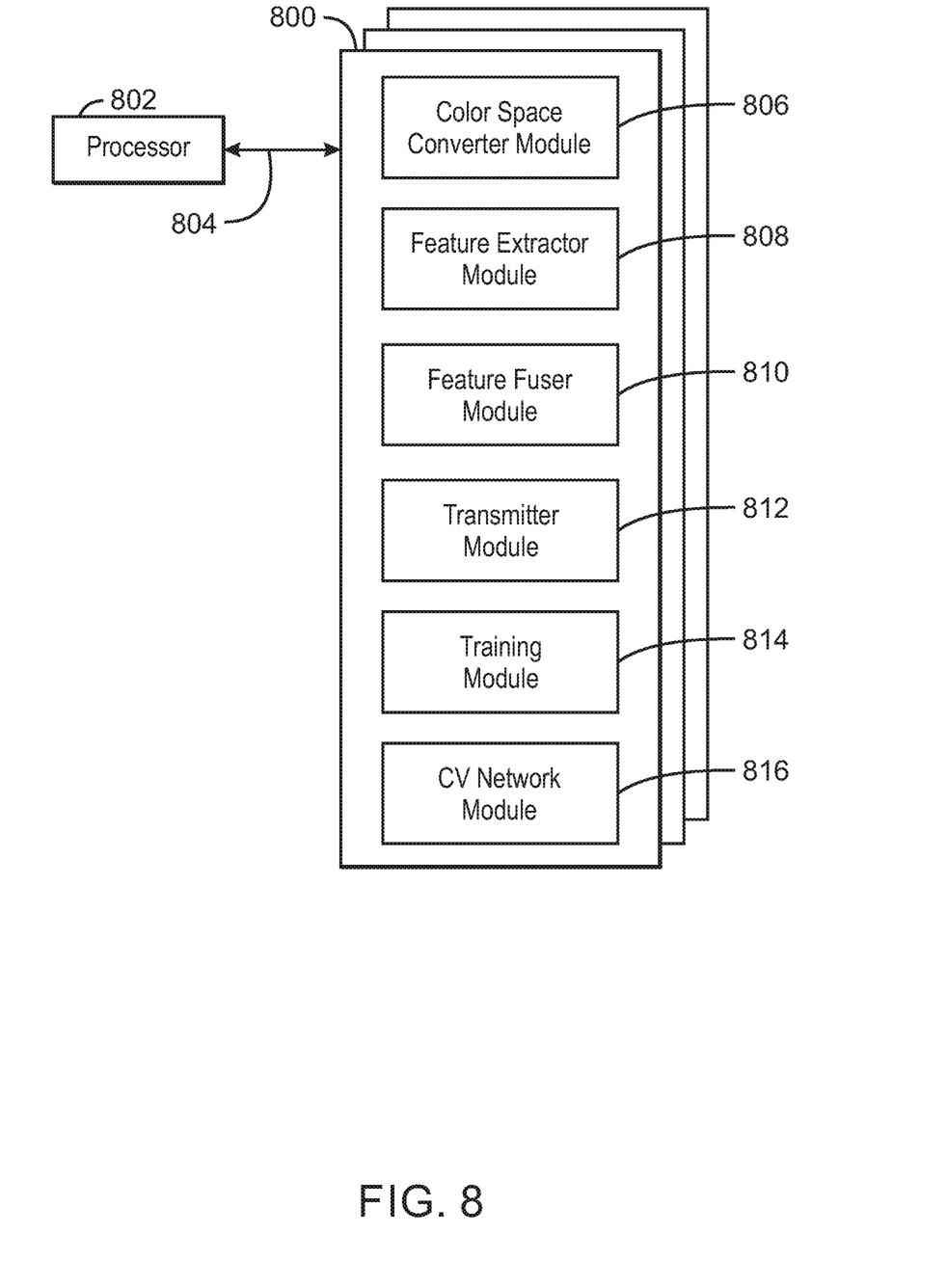
FIG. 8 is a block diagram showing computer readable media that store code for training and performing computer vision tasks with a trainable vision scaler.

FIG. 8 is a block diagram showing computer readable media 800 that store code for training and performing computer vision tasks with a trainable vision scaler. The computer readable media 800 may be accessed by a processor 802 over a computer bus 804. Furthermore, the computer readable medium 800 may include code configured to direct the processor 802 to perform the methods described herein. In some embodiments, the computer readable media 800 may be non-transitory computer readable media. In some examples, the computer readable media 800 may be storage media.

The various software components discussed herein may be stored on one or more computer readable media 800, as indicated in FIG. 8. For example, a color space converter module 806 may be configured to modify a color space of a received image. A feature extractor module 808 may be configured to extract features from the received image. In some examples, the feature extractor module 808 may be configured to detect edges or textures in the received image. In some examples, the feature extractor module 808 may be configured to apply a simple or complex image enhancement filter to the received image. In some examples, the feature extractor module 808 may be configured to downscale the image based on the extracted features using flexible stride control. A feature fuser module 810 may be configured to generate a feature map or enhanced image based on extracted features. For example, the feature fuser module 810 may be configured to generate a feature map or enhanced image that includes a number of channels that matches a CV network input. A transmitter module 812 may be configured to transmit the feature map or the enhanced image to computer vision (CV) network. For example, the CV network may perform a CV task based on the feature map or enhanced image. In various examples, the transmitter module 812 may be configured to transmit a mean, a maximum, and a minimum pixel value of output per channel. A training module 814 may be configured to train a trainable vision network. For example, the trainable vision network may include the color space converter module 806, the feature extractor module 808, and the feature fuser module 810. In some examples, the training module 814 may be configured to train the trainable visual scaler using restricted feature activations and parameters. In some examples, the training module 814 may be configured to jointly train the trainable visual scaler end-to-end with the computer vision network. In some examples, the training module 814 may be configured to train the trainable visual scaler using a loss function associated with the computer vision network. In some examples, the training module 814 may be configured to train the trainable visual scaler with a second computer vision network that is trained to perform a vision task that is similar to the vision task performed by the computer vision network. A computer vision (CV) network module 816 may be configured to perform CV tasks based on the feature map or enhanced image. In various examples, the computer vision (CV) network module 816 is configured to whiten the feature map or the enhanced image based on a received mean, maximum, and minimum pixel value of output per channel.

The block diagram of FIG. 8 is not intended to indicate that the computer readable media 800 is to include all of the components shown in FIG. 8. Further, the computer readable media 800 may include any number of additional components not shown in FIG. 8, depending on the details of the specific implementation. For example, the computer readable media 800 may include instructions to perform multiple passes of processing on the received image in response to detecting a target downscale factor that exceeds a threshold factor.

EXAMPLES

Example 1 is an apparatus for processing images. The apparatus includes a trainable vision scaler to receive an image. The trainable vision scaler is to also generate an output comprising a feature map or an enhanced image based on the image. The trainable vision scaler is to further transmit the output to a computer vision network. The computer vision network is trained to perform a computer vision task using the output.

Example 2 includes the apparatus of example 1, including or excluding optional features. In this example, the trainable vision scaler includes a color space converter to convert a color space of the image into a color space detected during training.

Example 3 includes the apparatus of any one of examples 1 to 2, including or excluding optional features. In this example, the trainable vision scaler includes a feature extractor trained to extract features from the received image.

Example 4 includes the apparatus of any one of examples 1 to 3, including or excluding optional features. In this example, the trainable vision scaler includes a feature extractor trained to enhance the image to generate the enhanced image.

Example 5 includes the apparatus of any one of examples 1 to 4, including or excluding optional features. In this example, the trainable vision scaler includes a feature extractor trained to downscale the image using flexible stride control.

Example 6 includes the apparatus of any one of examples 1 to 5, including or excluding optional features. In this example, the trainable vision scaler includes a feature fuser to generate the output. The output further includes a mean, a maximum, and a minimum pixel value of output per channel.

Example 7 includes the apparatus of any one of examples 1 to 6, including or excluding optional features. In this example, the trainable vision scaler includes a convolutional neural network.

Example 8 includes the apparatus of any one of examples 1 to 7, including or excluding optional features. In this example, the trainable vision scaler is jointly trained end-to-end with the computer vision network.

Example 9 includes the apparatus of any one of examples 1 to 8, including or excluding optional features. In this example, the trainable vision scaler is trained using a loss function associated with the computer vision network.

Example 10 includes the apparatus of any one of examples 1 to 9, including or excluding optional features. In this example, the trainable vision scaler is trained with a second computer vision network that is trained to perform a vision task that is similar to the vision task performed by the computer vision network.

Example 11 is a method for processing images. The method includes modifying, via a processor executing a trained trainable visual scaler, a color space of a received image. The method includes extracting, via the processor, features from the received image. The method includes generating, via the processor, feature map or enhanced image based on extracted features. The method includes and transmitting, via the processor, the feature map or the enhanced image to computer vision (CV) network. The CV network is to perform a CV task based on the feature map or enhanced image.

Example 12 includes the method of example 11, including or excluding optional features. In this example, modifying the color space of the received image includes converting the color space of the image into a color space learned during training.

Example 13 includes the method of any one of examples 11 to 12, including or excluding optional features. In this example, the method includes performing multiple passes of processing on the received image in response to detecting a target downscale factor that exceeds a threshold factor.

Example 14 includes the method of any one of examples 11 to 13, including or excluding optional features. In this example, extracting the features from the received image includes applying a simple or complex image enhancement filter to the received image.

Example 15 includes the method of any one of examples 11 to 14, including or excluding optional features. In this example, generating the enhanced image includes downscaling the image based on the extracted features using flexible stride control.

Example 16 includes the method of any one of examples 11 to 15, including or excluding optional features. In this example, the method includes training the trainable visual scaler using restricted feature activations and parameters.

Example 17 includes the method of any one of examples 11 to 16, including or excluding optional features. In this example, the method includes jointly training the trainable visual scaler end-to-end with the computer vision network.

Example 18 includes the method of any one of examples 11 to 17, including or excluding optional features. In this example, the method includes training the trainable visual scaler using a loss function associated with the computer vision network.

Example 19 includes the method of any one of examples 11 to 18, including or excluding optional features. In this example, the method includes training the trainable visual scaler with a second computer vision network that is trained to perform a vision task that is similar to the vision task performed by the computer vision network.

Example 20 includes the method of any one of examples 11 to 19, including or excluding optional features. In this example, the method includes transmitting, via the processor, a mean pixel value, a maximum pixel value, and a minimum pixel value of output per channel to the CV network. The CV network is to perform whitening on the feature map or the enhanced image based on the mean pixel value, the maximum pixel value, and the minimum pixel value of output per channel.

Example 21 is at least one computer readable medium for processing images having instructions stored therein that direct the processor to modify a color space of a received image. The computer-readable medium includes instructions that direct the processor to extract features from the received image. The computer-readable medium includes instructions that direct the processor to generate a feature map or enhanced image based on extracted features. The computer-readable medium includes instructions that direct the processor to transmit the feature map or the enhanced image to computer vision (CV) network. The CV network is to perform a CV task based on the feature map or enhanced image.

Example 22 includes the computer-readable medium of example 21, including or excluding optional features. In this example, the computer-readable medium includes instructions to convert the color space of the image into a color space learned during training.

Example 23 includes the computer-readable medium of any one of examples 21 to 22, including or excluding optional features. In this example, the computer-readable medium includes instructions to perform multiple passes of processing on the received image in response to detecting a target downscale factor that exceeds a threshold factor.

Example 24 includes the computer-readable medium of any one of examples 21 to 23, including or excluding optional features. In this example, the computer-readable medium includes instructions to apply a simple or complex image enhancement filter to the received image.

Example 25 includes the computer-readable medium of any one of examples 21 to 24, including or excluding optional features. In this example, the computer-readable medium includes instructions to downscale the image based on the extracted features using flexible stride control.

Example 26 includes the computer-readable medium of any one of examples 21 to 25, including or excluding optional features. In this example, the computer-readable medium includes instructions to train the trainable visual scaler using restricted feature activations and parameters.

Example 27 includes the computer-readable medium of any one of examples 21 to 26, including or excluding optional features. In this example, the computer-readable medium includes instructions to jointly train the trainable visual scaler end-to-end with the computer vision network.

Example 28 includes the computer-readable medium of any one of examples 21 to 27, including or excluding optional features. In this example, the computer-readable medium includes instructions to train the trainable visual scaler using a loss function associated with the computer vision network.

Example 29 includes the computer-readable medium of any one of examples 21 to 28, including or excluding optional features. In this example, the computer-readable medium includes instructions to train the trainable visual scaler with a second computer vision network that is trained to perform a vision task that is similar to the vision task performed by the computer vision network.

Example 30 includes the computer-readable medium of any one of examples 21 to 29, including or excluding optional features. In this example, the computer-readable medium includes instructions to transmit a mean pixel value, a maximum pixel value, and a minimum pixel value of output per channel to the CV network. The CV network is to perform whitening on the feature map or the enhanced image based on the mean pixel value, the maximum pixel value, and the minimum pixel value of output per channel.

Example 31 is a system for processing images. The system includes a trainable vision scaler to receive an image. The trainable vision scaler is to generate an output including a feature map or an enhanced image based on the image. The trainable vision scaler is to transmit the output to a computer vision network. The computer vision network is trained to perform a computer vision task using the output.

Example 32 includes the system of example 31, including or excluding optional features. In this example, the trainable vision scaler includes a color space converter to convert a color space of the image into a color space detected during training.

Example 33 includes the system of any one of examples 31 to 32, including or excluding optional features. In this example, the trainable vision scaler includes a feature extractor trained to extract features from the received image.

Example 34 includes the system of any one of examples 31 to 33, including or excluding optional features. In this example, the trainable vision scaler includes a feature extractor trained to enhance the image to generate the enhanced image.

Example 35 includes the system of any one of examples 31 to 34, including or excluding optional features. In this example, the trainable vision scaler includes a feature extractor trained to downscale the image using flexible stride control.

Example 36 includes the system of any one of examples 31 to 35, including or excluding optional features. In this example, the trainable vision scaler includes a feature fuser to generate the output. The output further includes a mean, a maximum, and a minimum pixel value of output per channel.

Example 37 includes the system of any one of examples 31 to 36, including or excluding optional features. In this example, the trainable vision scaler includes a convolutional neural network.

Example 38 includes the system of any one of examples 31 to 37, including or excluding optional features. In this example, the trainable vision scaler is jointly trained end-to-end with the computer vision network.

Example 39 includes the system of any one of examples 31 to 38, including or excluding optional features. In this example, the trainable vision scaler is trained using a loss function associated with the computer vision network.

Example 40 includes the system of any one of examples 31 to 39, including or excluding optional features. In this example, the trainable vision scaler is trained with a second computer vision network that is trained to perform a vision task that is similar to the vision task performed by the computer vision network.

Example 41 is a system for processing images. The system includes means for receiving an image. The system includes means for generating an output including a feature map or an enhanced image based on the image. The system includes means for transmitting the output to a computer vision network. The computer vision network is trained to perform a computer vision task using the output.

Example 42 includes the system of example 41, including or excluding optional features. In this example, the system includes means for converting a color space of the image into a color space detected during training.

Example 43 includes the system of any one of examples 41 to 42, including or excluding optional features. In this example, the system includes means for extracting features from the received image.

Example 44 includes the system of any one of examples 41 to 43, including or excluding optional features. In this example, the system includes means for enhancing the image to generate the enhanced image.

Example 45 includes the system of any one of examples 41 to 44, including or excluding optional features. In this example, the system includes means for downscaling the image using flexible stride control.

Example 46 includes the system of any one of examples 41 to 45, including or excluding optional features. In this example, the system includes means for generating the output the output further including a mean, a maximum, and a minimum pixel value of output per channel.

Example 47 includes the system of any one of examples 41 to 46, including or excluding optional features. In this example, the means for generating the output includes a convolutional neural network.

Example 48 includes the system of any one of examples 41 to 47, including or excluding optional features. In this example, the means for generating the output is jointly trained end-to-end with the computer vision network.

Example 49 includes the system of any one of examples 41 to 48, including or excluding optional features. In this example, the means for generating the output is trained using a loss function associated with the computer vision network.

Example 50 includes the system of any one of examples 41 to 49, including or excluding optional features. In this example, the means for generating the output is trained with a second computer vision network that is trained to perform a vision task that is similar to the vision task performed by the computer vision network.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described herein may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for processing images, comprising:
   memory; and
   a processor to implement a trainable vision scalar (TVS) to:

convert input data from an image sensor to a color space learned through training of a neural network;
generate an output based on the input data, the output including a feature map based on a received image;
determine whether a computer vision (CV) network is available;
initiate a training type based on the availability of the CV network, wherein a first training type includes training the TVS as a non-linear mapper in response to determining the CV network is available, and a second training type includes training the TVS as a non-linear mapper based on a loss function of the CV network in response to determining the CV network is not available; and
transmit the output to the computer vision network, wherein the computer vision network is trained to perform a computer vision task using the output.

2. The apparatus of claim 1, wherein the trainable vision scaler includes a feature extractor trained to extract features from the received image.

3. The apparatus of claim 1, wherein the trainable vision scaler includes a feature extractor trained to enhance the received image to generate an enhanced image.

4. The apparatus of claim 1, wherein the trainable vision scaler includes a feature extractor trained to downscale the received image using flexible stride control.

5. The apparatus of claim 1, wherein the trainable vision scaler includes a feature fuser to generate the output, the output further including a mean, a maximum, and a minimum pixel value of output per channel.

6. The apparatus of claim 1, wherein the trainable vision scaler includes a convolutional neural network.

7. The apparatus of claim 1, wherein the trainable vision scaler is jointly trained end-to-end with the computer vision network.

8. The apparatus of claim 1, wherein the trainable vision scaler is trained with a second computer vision network that is trained to perform a vision task.

9. A method for processing images, comprising:
converting, via a processor executing a trained trainable visual scaler (TVS), input data from an image sensor to a color space learned through training of a neural network;
extracting, via the processor, features from a received image;
generating, via the processor, a feature map based on the extracted features;
determining whether a computer vision (CV) network is available;
initiating a training type based on the availability of the CV network, wherein a first training type includes training the TVS as a non-linear mapper in response to determining the CV network is available, and a second training type includes training the TVS as a non-linear mapper based on a loss function of the CV network in response to determining the CV network is not available; and
transmitting, via the processor, the feature map to the CV network, wherein the CV network is to perform a CV task based on the feature map.

10. The method of claim 9, including performing multiple passes of processing on the received image in response to detecting a target downscale factor that exceeds a threshold factor.

11. The method of claim 9, wherein extracting the features from the received image includes applying at least one of a simple or a complex image enhancement filter to the received image.

12. The method of claim 9, further including generating an enhanced image by downscaling the received image based on the extracted features using flexible stride control.

13. The method of claim 9, including training the trainable visual scaler using restricted feature activations and parameters.

14. The method of claim 9, including jointly training the trainable visual scaler end-to-end with the computer vision network.

15. The method of claim 9, including training the trainable visual scaler with a second computer vision network that is trained to perform a vision task.

16. The method of claim 9, including transmitting, via the processor, a mean pixel value, a maximum pixel value, and a minimum pixel value of output per channel to the CV network, wherein the CV network is to perform whitening on the feature map based on the mean pixel value, the maximum pixel value, and the minimum pixel value of output per channel.

17. A memory circuit for processing images having instructions stored therein that, in response to being executed on a computing device, cause the computing device to:
convert a color space of input data from an image sensor to a color space learned through training of a neural network;
extract features from a received image;
generate a feature map based on extracted features;
determine whether a computer vision (CV) network is available;
initiate a training type based on the availability of the CV network, wherein a first training type includes training a trainable vision scaler (TVS) as a non-linear mapper in response to determining the CV network is available, and
a second training type includes training the TVS as a non-linear mapper based on a loss function of the CV network in response to determining the CV network is not available; and
transmit the feature map to the CV network, wherein the CV network is to perform a CV task based on the feature map.

18. The memory circuit of claim 17, wherein the instructions, when executed, cause the computing device to perform multiple passes of processing on the received image in response to detecting a target downscale factor that exceeds a threshold factor.

19. The memory circuit of claim 17, wherein the instructions, when executed, cause the computing device to apply at least one of a simple or a complex image enhancement filter to the received image.

20. The memory circuit of claim 17, wherein the instructions, when executed, cause the computing device to downscale the image based on the extracted features using flexible stride control.

* * * * *